Dec. 15, 1936.  E. W. HARTMAN  2,064,000
SEPARATING APPARATUS
Filed Jan. 11, 1933  6 Sheets-Sheet 1

INVENTOR.
EMANUEL W. HARTMAN
BY
ATTORNEY

Dec. 15, 1936.  E. W. HARTMAN  2,064,000
SEPARATING APPARATUS
Filed Jan. 11, 1933  6 Sheets-Sheet 2
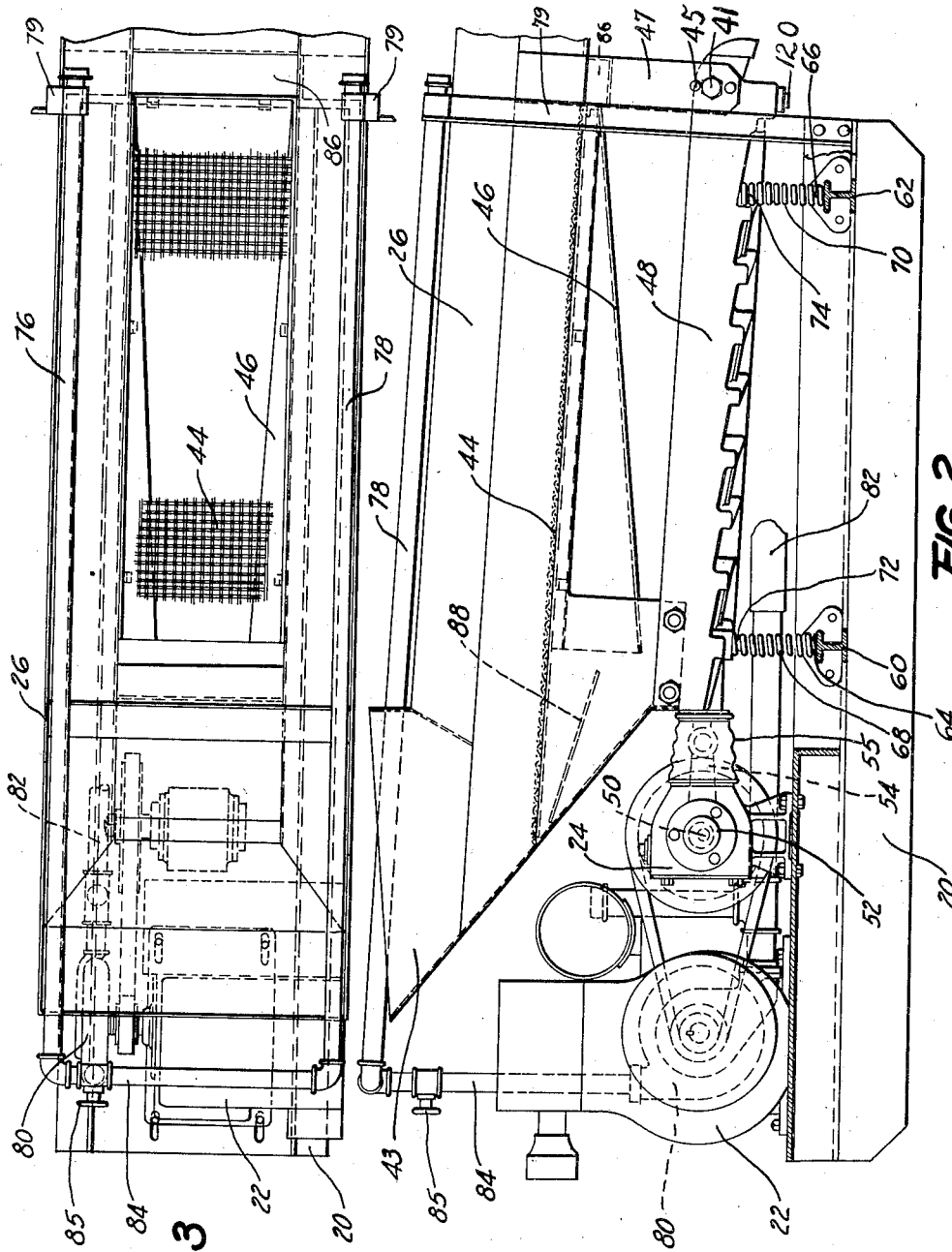
INVENTOR.
EMANUEL W. HARTMAN
BY
ATTORNEY Dec. 15, 1936.  E. W. HARTMAN  2,064,000
SEPARATING APPARATUS
Filed Jan. 11, 1933  6 Sheets-Sheet 3
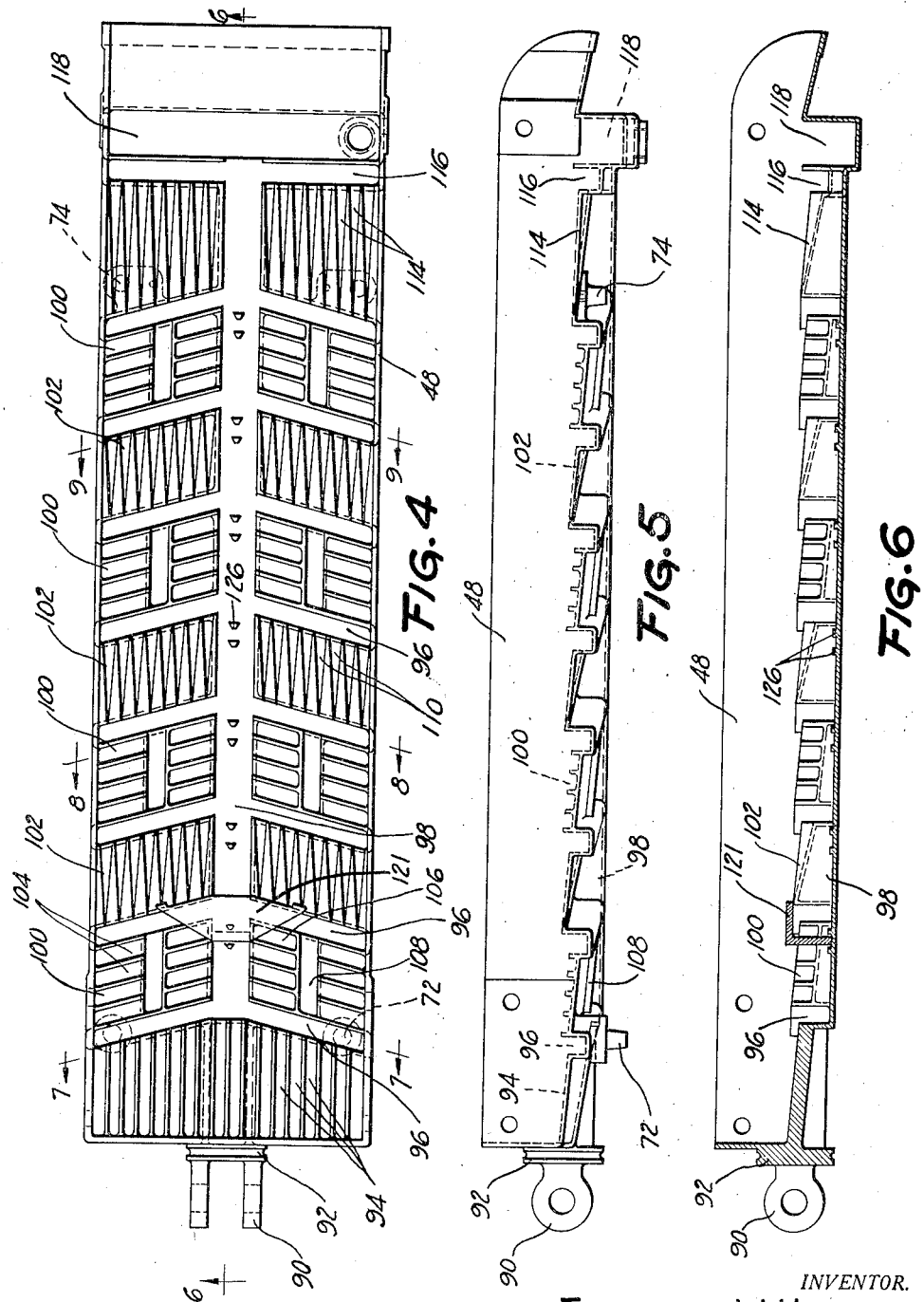
INVENTOR.
EMANUEL W. HARTMAN
BY J. P. Keiper
ATTORNEY

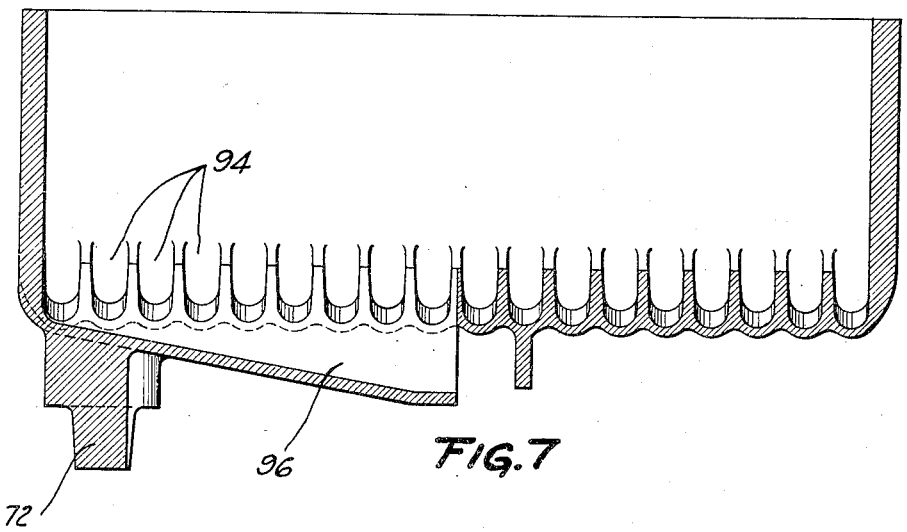
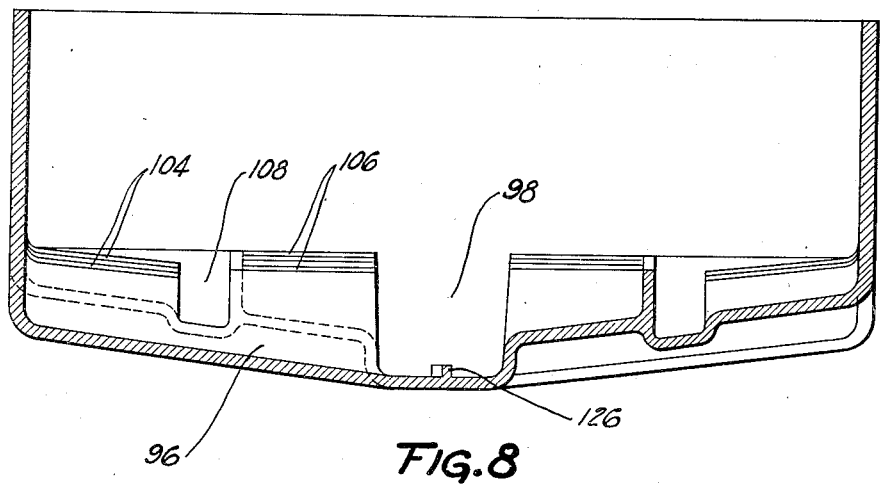

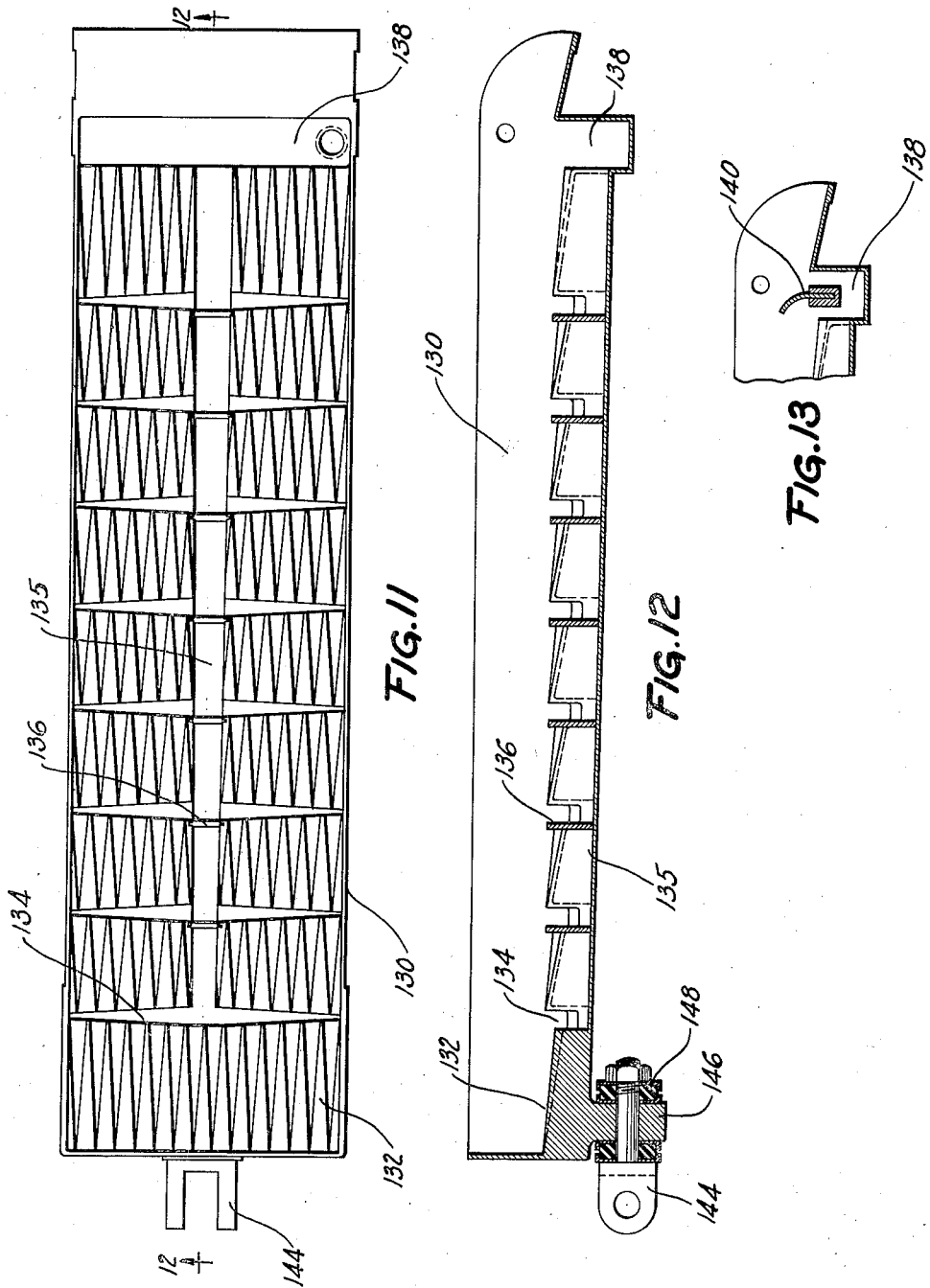

Patented Dec. 15, 1936

2,064,000

UNITED STATES PATENT OFFICE 2,064,000

SEPARATING APPARATUS

Emanuel W. Hartman, Glendale, Calif., assignor to Hartman Gold Placer Syndicate, Chicago, Ill.

Application January 11, 1933, Serial No. 651,195

5 Claims. (Cl. 209—485)

This invention relates to an apparatus for the separation of solids and particularly to an apparatus for separating relative heavy or dense substances such as gold or platinum from a mass of other material of lighter specific gravity generally.

In general such separation usually requires the breaking down of masses of ore bearing material by agitation and the application of a conveying medium for the lighter particles consisting for example, of water or an air blast, and some form of trap of which a riffle board is a common type into which the heavier particles may sink and be more or less free from the action of the conveying medium.

It is accordingly an object of this invention to provide an improved mechanism for the separation of solids of different gravities which may be efficient, and which may be operated more or less continuously.

Another object of the invention is to provide an improved type of riffle board construction in which the lighter masses may flow more or less unobstructed across the top thereof while the heavier or denser masses are required to pass through a series of labyrinth passages whereby the degree of separation of the denser masses may be more fully completed.

A further object of the invention is to provide a compact well arranged complete machine which may be readily portable and which may handle large quantities of ore with a minimum of manual labor.

A still further object of the invention is to provide a machine adapted to treat virgin ore bearing masses in a manner such as to wash and screen out gangue, and further treat the remainder to separate according to density by gravitational action.

Still another object of the invention is to provide in combination with a machine of the type described a system of conveyors for feeding the ore and carrying away the tailings, which is so arranged as to be driven by and in unison with the machine for the purpose of further reducing the manual cost of operation.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, references being had for this purpose to the appended claims.

In the drawings wherein similar reference characters refer to similar parts throughout the several views:

Figure 2 is a side elevation greatly enlarged and partly in section of the ore separator apparatus of Figure 1;

Figure 3 is a top plan view of the separator illustrating the arrangement of the various parts;

Figure 4 is a top plan view of the riffle board as employed in Figure 2;

Figure 5 is a side elevation of the riffle board showing the riffle contour;

Figure 6 is a longitudinal section through the riffle board on the line 6—6 of Figure 4;

Figure 7 is a cross section through the riffle board on the line 7—7 of Figure 4;

Figure 8 is a cross section through the riffle board taken on the line 8—8 of Figure 4;

Figure 11 is a top plan view of a modified form of riffle board;

Figure 12 is a section through the line 12—12 of Figure 11; and

Figure 13 is a fragmental section of a riffle board showing a modified form of gold pocket with a deflector.

Figure 1:
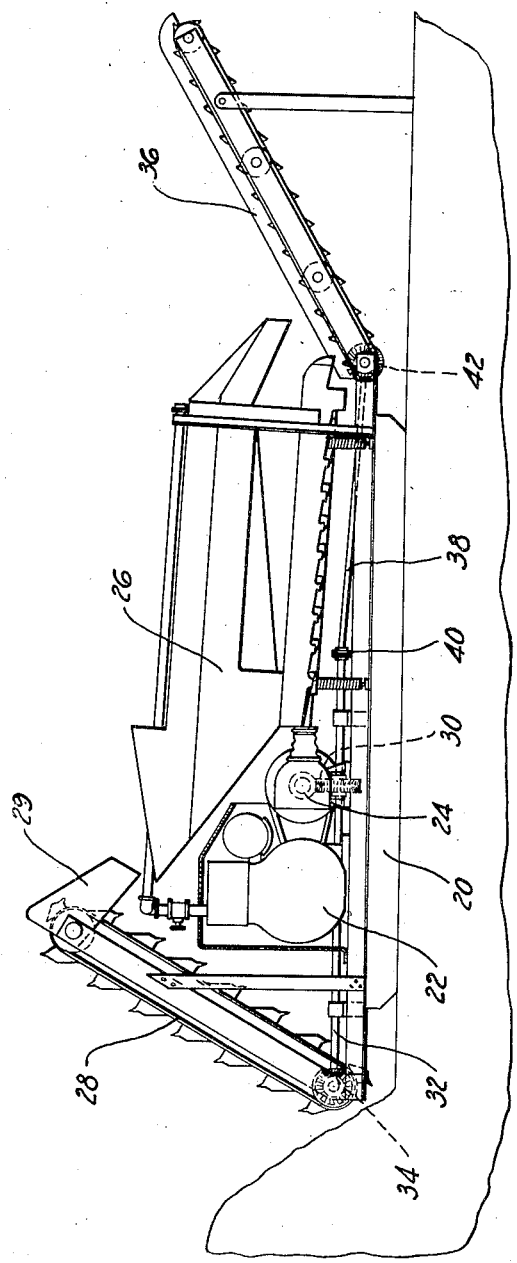
Figure 1 illustrates a general layout view of an ore separator adapted for use in conjunction with feed and discharge conveyors.

Referring to the drawings and more particularly Figure 1, there is illustrated therein a mining machine generally comprising a frame 20, carrying a small engine or prime mover 22, transmission 24, and resiliently mounted ore separation apparatus 26. As shown, a belt conveyor system 28 is adapted to feed material to the separation apparatus by means of the chute 29 and may be operated from the engine 22 by means of the worm and wheel drive 30, shaft 32 and bevel gears 34. The discharge from the separation apparatus may be handled by a discharge or tailings belt conveyor 36, which may also be driven from the engine through suitable shafting 38 including universal joints 40 and bevel gears 42.

As illustrated in enlarged form in Figures 2 and 3, the ore separation apparatus may include a hopper 43 adapted to discharge material upon the upper end of the sloping grizzly or screen 44, which screen is adapted to permit the finer particles to drop through upon the return chute 46 and from thence downward upon the upper end of the sloping riffle board 48. To adjust the slope of the screen, the support 47 is provided with a plurality of holes 45 for the bolt 41.

In order to continuously agitate or shake the masses while passing through the various paths provided, the engine or prime mover 22 drives the countershaft 50 in the transmission 24 which carries thereon an eccentric 52 and connecting rod 54 secured at its free end to the riffle board 48. In practice, a throw slightly in excess of a half-inch and at a rate of approximately 250 revolutions per minute has been found satisfactory although it may be found advisable to alter the speed and throw to suit various material as may be found in practice. Preferably these drive elements are totally enclosed within a suitable housing, and a flexible housing 55 may be provided to enclose the connecting rod and its connection to the riffle board.

To support the separator mechanism in a manner free from wear, it has been found preferable to provide some form of resilient support whereby the use of wearing surfaces, which in a machine of this type would be continually exposed to dirt and dust, may be avoided. To this end, there is provided upon the frame 20 a pair of cross members 60 and 62 having bosses or upward extending pins 64 and 66 upon which are snuggly mounted coil springs 68 and 70, preferably four in number, which in turn engage similar bosses or pins 72 and 74 upon the under side of the riffle board. The springs while supporting the weight permit the free horizontal movement of the riffle board required for proper action. Such a suspension also may permit lateral as well as longitudinal motion, which may in some instances be found desirable, although no power connection is shown herein for producing such lateral movement directly.

In order to aid in the separation process and to provide a suitable conveying medium for the lighter masses, water is preferably discharged upon the masses in the grizzly by means of pipes 76 and 78 supported at one end upon suitable supports 79 secured to the frame 20, which pipes are provided with a plurality of suitably arranged spaced apertures directed toward the grizzly or screen. For the purpose of continuously supplying water to the pipes a pump 80, which may be mounted for direct drive on the engine shaft is provided together with suitable intake connections 82 and distributing pipes 84 and regulating valve 85 to govern the supply of water.

Since it occasionally happens that a nugget of precious metal is found which would be too coarse to pass through the grizzly, there is provided a trough or catch basin 86 at the lower end of the grizzly into which such heavy elements may fall thus preventing their discharge along with the other coarse particles or gangue of relatively no value.

In order that uneven feeding of the hopper with raw masses may not cause uneven feeding of the upper end of the riffle board, a baffle 88 may be provided to prevent the direct flow of material from the grizzly to the riffle board but on the other hand requires all material fed to the riffle board to drop off of the lower end of chute 46. This permits the machine to be fed by a steady stream as by the endless belt conveyors of Figure 1 where large machines are used or by the hand discontinuous methods as may be found practicable.

Referring more particularly to the riffle board construction, one modification of which is illustrated in detail in Figures 4-9, it will be seen that the upper or head end thereof is provided with a wrist pin bearing member 90 for the connecting rod 54 and a circular boss 92 adapted to engage in water and dust tight manner the flexible housing 55.

The board itself may consist of a casting or forging or other suitable material, the surface of which is provided with a riffle construction in accordance with the novel principles of this invention. Around the edge of the board and the high or head end is provided a suitable side wall of sufficient height to assure no loss of material thereover.

The surface of the board at the head end is provided with a plurality of parallel longitudinal grooves 94 sloped downwardly with respect to the plane of the board and towards the lower end thereof and enter into a crosswise channel 96, as is illustrated in detail in the sectional view of Figure 7. Preferably the crosswise channel 96 however, extends slightly oblique to the center line since such arrangement permits better movement of the mass along the board, this resulting from the fact that the longitudinal reciprocating movement may have a small component directed along an oblique running channel.

The intermediate portion of the board comprises a series of alternate sections 100 and 102 containing crosswise riffles and longitudinal riffles. The section 100 containing the crosswise riffles is preferably made up of two sets of crosswise riffles 104 and 106 on either side of a central longitudinal passage 98, the outer set of which slope into a short longitudinal channel 108, which in turn extends into a second deeper cross channel 96, similar to that just below the head end section containing the longitudinal grooves 94. The inner set of crosswise riffles slope towards and empty into the longitudinal central passage 98, all of which detail is illustrated in the section shown in Figure 8.

Figure 9:
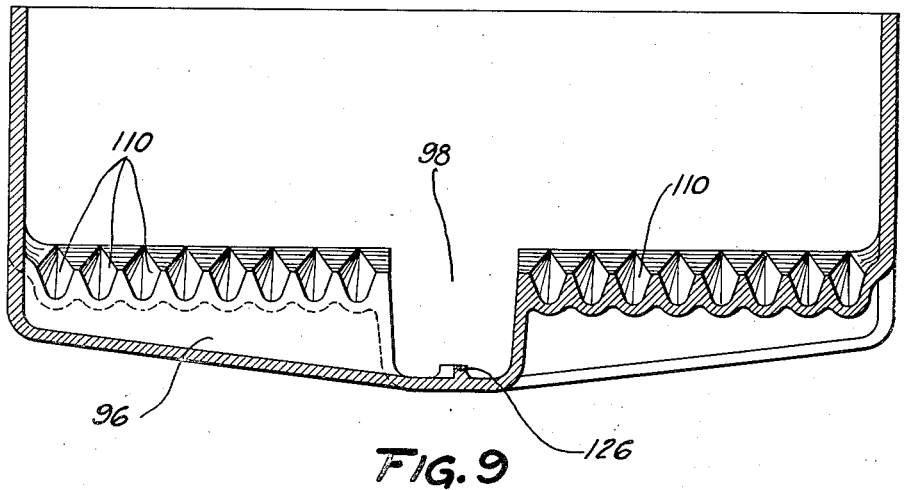
Figure 9 is a further cross section through the riffle board taken on the line 9—9 of Figure 4.
Figure 10:
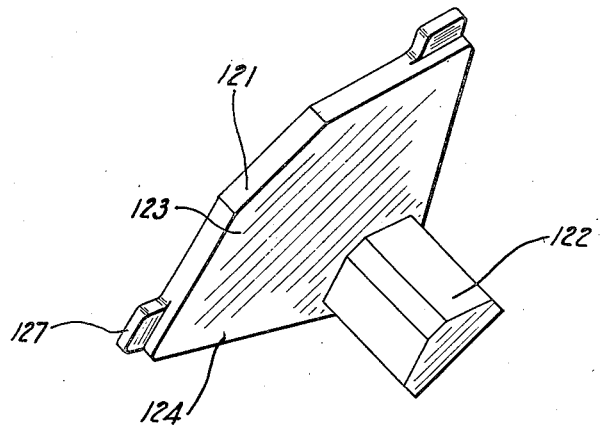
Figure 10 is a perspective view of a wing dam showing the under side thereof.

Sections 102 which are alternated with sections 100 above described, consist of a plurality of longitudinal grooves 110 of gradually increasing width and depth, and sloping downward slightly with respect to the plane of the riffle board as illustrated in Figure 9. Each of these grooves likewise empties into another crosswise channel 96 which in turn is adapted to discharge into the central longitudinal channel.

At the lower end of the board is provided a section of riffles 114 similar to those at 102 which in turn discharge into a cross channel 116, which similar to channel 96 discharges into the main channel 98. At the extreme end of the board is provided a trap or gold pocket 118 into which the channel 98 discharges and from which gold concentrate may be removed by means of the plug 120 in the base thereof, the pocket having a slope crosswise thereof, so that the plug may be at the lowest point. This pocket may be filled if desired with a quantity of mercury, which may from time to time be drawn off and replaced with fresh mercury, the mercury amalgamating with any gold which may be directed into the pocket, it being readily understood in the art that subsequently the mercury is readily distilled out of the gold in a retort in a common distillation process. The machine, however, will function efficiently without the presence of mercury.

In order to obstruct the free flow of heavier masses along the central channel 98, and to keep the masses passing along the top more or less evenly distributed over the surface, wing dams 121 are provided, one of which is shown in place in Figure 4. As illustrated, the wing dam comprises a tongue portion 122 which is adapted to extend into the channel, and a flat upper portion, which spreads out over the surface of the board. The leading edges 124 of the wing dam present a sloping surface which tends to spread out the lighter material flowing across the top of the board and tends to neutralize the effect of the opposite slope of the riffles. These wing dams also increase the turbulence of the water which may pass over them, and as a result assure the wetting of all particles, thus preventing the possibility of flake gold being carried away on the stream. To hold the wing dam in place, bosses or projecting lugs 126 may be provided in the base of the central channel 98, which lugs are preferably streamlined and engage either side of the tongue portion 122 of the wing dam. The wing part 123 may be provided with lugs 127, which engage the upper corner of the adjacent section, as shown, the section being 102. The arrangement for securing the wing dams may be varied as desired, a variation being shown in Figures 11 and 12 hereinafter described. It may also be found desirable to extend the tongue portion 122 short of the bottom of the channel, so that heavy particles on the bottom of the channel may pass on down the channel and thus be trapped in the pocket at the lower end. In such an instance the lugs 126 may be extended sufficiently high to meet the tongue and secure it in place.

A modified form of riffle board 130, which may be used with good success is shown in Figures 11 and 12 and comprises sections having longitudinal riffles 132 of tapered construction and cross channels 134, which are also tapered. Since these cross channels are at right angles to the movement of the board, no component of the longitudinal movement can aid in the discharge of these channels, and therefore it has been found desirable to taper the width thereof as well as the depth, although this feature may also be used to advantage in the board construction of Figure 4 and may be varied as desired. To obstruct the free flow of material down the center channel 135 dams 136 are placed at intervals which may be secured in place by slots in the side walls of the center channel. These dams may or may not extend to the base of the channel as may be desired, it being necessary if they extend to the base to clean the pockets formed thereby as well as the end pocket 138, since the heavier metals will be caught therein.

As shown in Figure 13, a baffle 140 may be set in cleats provided on the side walls of the riffle board to deflect the material passing over the pocket and thereby further delay the passage of the heavier materials to increase the efficiency of the apparatus. The trough 138 may also be filled with mercury as may be found desirable, although not necessarily, in which case there will be a tendency for the material deflected downward by the baffle to pass adjacent to or through the mercury.

Since the eccentric and connecting rod of Figures 1, 2 and 3 produce simple harmonic oscillations, which are the least jerky of any vibrations known, it may become advisable or preferable, to provide a more complex form of oscillation. For this purpose a connection such as shown in Figure 12 may be employed which includes a split eye pin 144 which extends through a lug 146 on the underside of the riffle board, and which is secured against movement by resilient rubber washers 148. This resilient connection can be modified by varying the thickness and shape of the rubber and will be found to produce a complex vibration better adapted for separation in some instances, where peculiarities of the ore are present.

The operation of the machine with the exception of the riffle boards will readily follow from the foregoing detailed description thereof. The fundamental purpose of the riffle board is to separate the denser particles from the particles of lesser density, which is accomplished by vibrating the board, creating movement between the material particles thereby permitting the particles of greater density to be precipitated through the lighter material to a lower level by gravitational action. A primary stratification with the lighter material above and the denser material below is thus created.

A secondary state of separation then follows and consists of bringing about a separation of the denser particles in the aforementioned lower strata. The density ratio existing between the material particles in the lower strata is progressively less than the ratio which existed between these particles and those in the upper strata; hence, the time required to bring about a separation, or fining down of these particles, will be prolonged.

The design of the table surface, makes provision for the additional time required by its irregular surface contour of grooves and channels, into which the denser particles are precipitated, in that it compels the denser particles of material to follow a tortuous or elongated path and extends the period of separation—also by having the denser material confined between the side walls of the channel system it is subject to more violent agitation or vibratory movement than the material in the upper strata above the table surface as it moves along the grooves and channels to the catch basin or end trough where it is retained, and periodically manually removed. The added intensity of vibratory movement, to which the material in the intercommunicating channel system is subject to, is an added stimulus to the further separation of the denser particles, such as gold or platinum from the metallic black sands and causes the extremely dense particles to be eventually precipitated to the floor of the channels and move along that surface to the floor of the catch pocket; and as the accumulation of the densest particles such as gold and platinum increases in depth, the lighter of the denser material in the pocket will be displaced until they pass over the discharge lip of the table.

From the foregoing it is very apparent that by this method of separation, the initial stage of separation is readily and quickly accomplished due to the favorable density ratio between the material particles in the strata above the surface of the table. In view of this rapid separation, the lighter materials which constitutes the major portion of the mass can be moved over the table at a more rapid speed and discharged, while the denser particles are subject to a prolonged separating action, and the extreme dense particles retained; hence, by this method the volume of material treated is greatly increased.

Though several embodiments and modifications of the invention have been illustrated and described, it is to be understood that the invention is not limited thereto but may be embodied in various mechanical forms. For example, the size and capacity of the apparatus may be varied at will, and the substitution of one conveying medium for another may also be made as set forth, and the slopes and angles of the various parts may be altered to suit conditions and varying ores, and may even be altered so as to do away with the necessity of a conveying medium such as air or water. As such and many other changes in construction and arrangement of parts may be made without departing from the spirit of the invention, as will be apparent to those skilled in the art, reference will be had to the appended claims for a definition of the limits of the invention.

What is claimed is:

1. In a separating table, a floor plate member of irregular surface contour having generally lateral channels or grooves arranged therein and emptying into deeper longitudinal channels, said lateral channels deepening toward the longitudinal channel.

2. A separating table comprising a central longitudinal channel, a plurality of sections on either side of said channel, short longitudinal grooves in said sections of gradually increasing cross sections, and transverse channels of gradually increasing cross sections connecting one end of each of said short grooves with said central channel.

3. A separating table comprising a main longitudinal channel, a plurality of similar sections on either side of said channel, a plurality of longitudinal grooves of gradually increasing cross section arranged in each section, and transverse channels connecting the large end of each groove with said main longitudinal channel.

4. A separating table comprising a central longitudinal channel, a plurality of sections on either side of said channel, short longitudinal grooves in said sections, and transverse channels of gradually increasing cross section connecting one end of each of said short grooves with said central channel.

5. A separating table comprising a main longitudinal channel, a plurality of grooves arranged on either side of said channel in combination with a wing dam member lying on said table and extending transversely over said grooves and into said channel, the transverse portion of said member having means adapted to engage some of the grooves to retain the member in proper position, and the dam portion of said member extending down into the main longitudinal channel but spaced from the bottom thereof to permit the passage of heavier materials thereunder.

EMANUEL W. HARTMAN.